Figure 1:
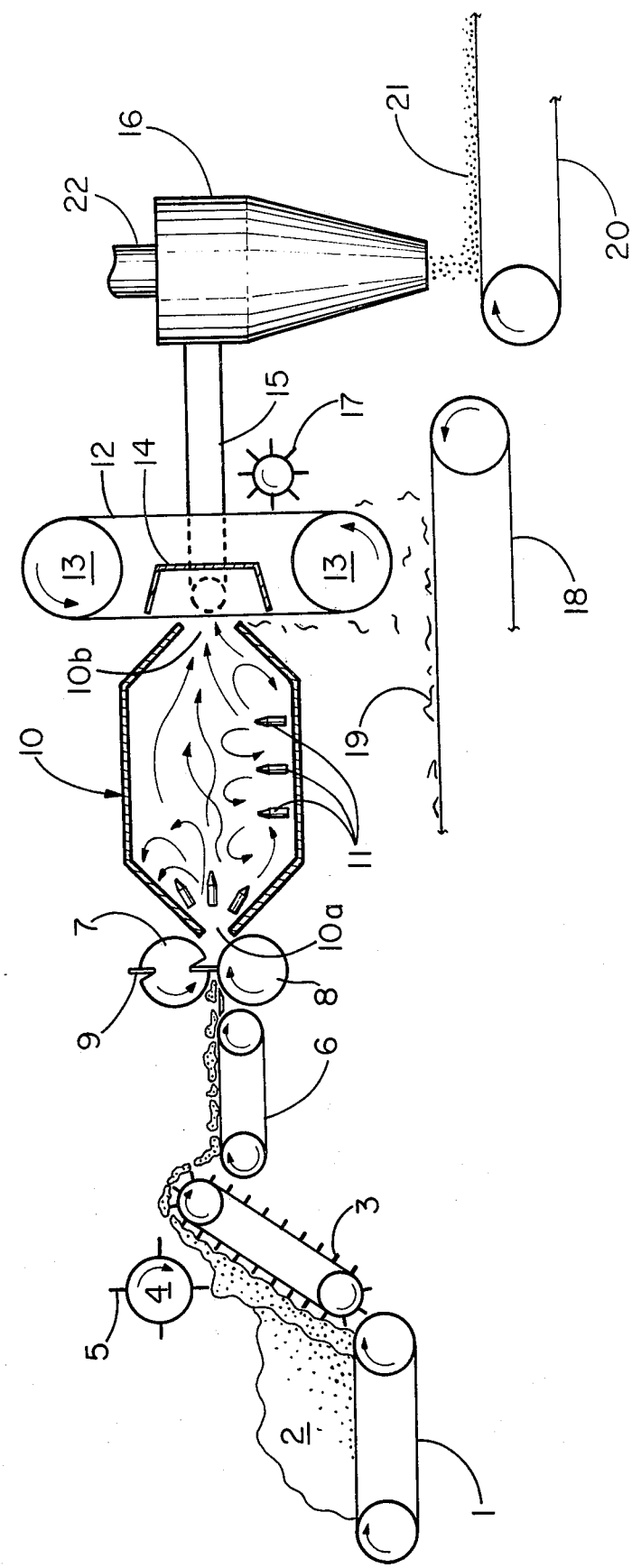

United States Patent [19]
Aldinger

[11] 3,909,397
[45] Sept. 30, 1975

[54] FIBER RECOVERY SYSTEM AND METHOD OF RECOVERY

[75] Inventor: Karl E. Aldinger, Appleton, Wis.

[73] Assignee: Kimberly-Clark Corporation, Neenah, Wis.

[22] Filed: Dec. 26, 1973

[21] Appl. No.: 427,460

[52] U.S. Cl. .......................... 209/3; 83/98; 83/177; 209/250; 209/307; 209/390
[51] Int. Cl............................................. B07b 1/10
[58] Field of Search ............... 209/2, 3, 250, 30, 31, 209/32, 33, 34, 35, 133, 134, 135, 136, 137, 45; 83/98, 177, 355, 307

[56] References Cited
UNITED STATES PATENTS

| | | | |
|---|---|---|---|
| 1,624,717 | 4/1927 | Davis | 209/30 |
| 1,873,395 | 8/1932 | Hallam et al. | 209/2 |
| 3,530,755 | 9/1970 | Cougler | 83/355 |

FOREIGN PATENTS OR APPLICATIONS

| | | | |
|---|---|---|---|
| 975,557 | 10/1950 | France | 209/45 |

Primary Examiner—Frank W. Lutter
Assistant Examiner—Gregory N. Clements

[57] ABSTRACT

Apparatus for the recovery of absorbent wood pulp fibers in fluff form from scrap and waste products such as production reject disposable diapers and sanitary napkins, includes a combination of cutter means to reduce the scrap products to small pieces, pneumatically agitating means to separate fibers from other components of the waste products, and a traveling screen for separating airborne fibers from other larger portions of the scrap products.

4 Claims, 1 Drawing Figure

FIBER RECOVERY SYSTEM AND METHOD OF RECOVERY

BACKGROUND OF THE INVENTION

The present invention pertains to a new and novel apparatus arrangement for fiber recovery from scrap materials containing wood pulp fibers in absorbent form. Such products as disposable diapers and sanitary napkins, whether in complete form as production rejects, fragments of the products in incomplete form or as simply excess scrap material may be recovered by the method and apparatus of invention by providing means to open up the scrap products to expose the absorbent fiber bodies. It is desirable in the practice of the process and the use of the apparatus that the absorbent cellulosic wood pulp fibers do not become wetted during opening and recovery as such would inhibit the separating action and tend to adversely affect the utility of newly recovered fibers.

SUMMARY OF THE INVENTION

A principle object of the present invention is to provide a new and useful method for recovering cellulosic wood pulp fibers from disposable scrap products such as diapers, sanitary napkins and the like wherein the fibers are present with retaining sheet wrappers, the recovery to be such that there is no significant damage to the absorbency characteristics of the fibers.

An important object of the invention is to provide an apparatus capable of freeing fibers from scrap material by supporting the fibers in an air stream and directing the air stream through a traveling screen with the fibers, larger components of the air stream being intercepted by the screen.

In the practice of the invention the scrap material is cut into pieces to expose the fibrous absorbent body, and the cut pieces are subjected to an agitator to free the fibers from the sheet material such as plastic films, nonwoven webs and the like. The fibers in a preferred embodiment of the invention are freed from the cut pieces by air jets, and the air simultaneously serves to release the fibers from the retaining sheet material and to carry the fibers from the zone of the agitator to a traveling screen which is permeable by the air and fibers but impermeable to larger pieces. The larger pieces are deflected by the screen to a waste system. The airborne fibers are then separated from the air and recovered.

The invention will be more fully understood by reference to the following detailed description and single FIGURE of the drawings, which sets out in schematic form equipment components for the practice of the invention.

As shown in the drawing, the numeral 1 designates a storage or bulk waste product section which is in the form of a conveyor belt, the bulk waste product being indicated at 2. The bulk waste 2 may commonly include production line rejects from sanitary products and/or disposable diaper manufacture. In either case the rejects will have some enclosing wrapper such as a nonwoven sheet, a plastic film sheet, or the like. The waste product 2 is transferred to an upwardly inclined conveyor 3 wherein a rotating cylinder 4 having smoothing blades 5 acts on the upwardly traveling waste to level out the material. The numeral 6 indicates a horizontally disposed conveyor which receives from the conveyor 3 waste material and feeds it toward a cutter 7. The cutter roll 7 includes blades 9 in diametric opposition and an anvil roll 8 spaced slightly from the cutter roll 7 to provide for the passage of the waste material. The cutter roll 7 is effective to reduce disposable diapers or sanitary napkins and like production reject material to a relatively small size. The size will depend upon the nature of the agitating action to some extent. For most purposes the cut material may suitably be cubical and ¼ inch on a side. Importantly, also, the action of the knife blades 9 results in exposing the fibrous absorbent body of the waste materials under consideration. The small pieces of the waste material are fed through the inlet 10A of the agitator 10 and are acted upon in the specific equipment illustrated by air jets 11 which serve to free the fibers from the retaining sheet materials and simultaneously suspend the fibers in an air stream which exits from the agitator through outlet 10B. Outlet 10B is preferably somewhat larger in dimension than the inlet providing for a good velocity of air through the outlet as the air supports the fibers and other cut pieces from which the fibers have been freed.

The air jets 11 are preferably disposed closely adjacent the inlet and along the path from the inlet toward the outlet but well short of the outlet so that a smooth air stream flows through the outlet. If desired, more than one cutter may act upon the material prior to submitting it to the agitator and more than one agitator may be used.

Traversing the outlet 10B of the agitator in close proximity thereto is a first vertical reach of a screen belt 12 which is supported by pulleys 13. An open front housing 14 is positioned behind the front reach and between the front and rear reaches of the belt and communicates with a conduit 15 which terminates in a cyclone 16. The housing opening is larger than the outlet 10B and provides for direct movement of fibers and air to the housing.

The rear reach of the belt 12 is contacted by brush roll 17 to assist in the removal from the screen belt of any particles not separated by gravity and which are prevented from passing the screening belt by the relatively small size of its openings. Such may include fiber clumps. The material rejected by the screen belt, which includes small pieces of sheet material such as nonwoven fabric from the covers of diapers and sanitary products or plastic film from diapers, falls vertically downwardly to belt 18 and such waste is indicated at 19. It may be transported for disposal or for further reworking, as desired, to any convenient location. The fiber passing the front reach of the screen belt 12 passes with the air through the conduit 15 into cyclone 16 which is effective to separate the air and fiber. The fiber is received on belt 20 and is indicated at 21 and, essentially, is ready for reuse in the procedure of making absorbent materials such as disposable diapers, sanitary napkins and the like. In the event that the combination of fiber and air passing the housing 14 and conduit 15 contains any excessive contaminants desirably removed for a specific purpose, the air-fiber flow may be redirected, for example, to the inlet of the agitator or other agitator equipment to obtain more complete fiber separation.

The air which serves to carry the fiber to the cyclone 16 is removed in conventional fashion through the conduit outlet 22 of the cyclone.

The agitator 10, which has been specifically indicated in the embodiment shown to be composed of air jets disposed within the agitator, may also take other forms. Mechanical action may, for example, be exerted on the cut material to free the fibers. When so used, care should be taken that the fibers themselves are not significantly cut, as excessive work on the fibers will destroy its most useful absorbency characteristics. Additionally, when mechanical action is required rather than the air jets indicated, a separate source of air must be utilized to carry the freed fibers to the belt screen 12. Preferably, the air employed is quite dry to avoid any tendency to condensate development in the equipment.

As many apparently widely different embodiments of this invention may be made without departing from the spirit and scope thereof, it is to be understood that I do not limit myself to the specific embodiments thereof except as defined in the appended claims.

I claim:

1. A fiber recovery apparatus for recovering fibers from fiber-sheet composite waste products which have the fibers in a fluff form and retained at least in part by covering sheet material, the said apparatus comprising means for feeding the waste products, cutter means positioned to receive the waste products from said feeding means, and to further feed and cut the products into small pieces, agitator means positioned for the receipt of the cut pieces and to work the cut pieces to free fibers from other component material of the waste products, a vertical traveling screen having a front and rear reach and having the front reach facing on the agitator means for receipt of the agitated and cut components, said traveling screen being substantially pervious to the fiber-air stream and substantially impervious to others of the component material directed to the screen so that said others of the components will be received on the front reach of the traveling screen, means including a hood to collect the air-fiber stream passing through the front reach of the traveling screen, means to intercept and remove the said other component material of the waste material as said other components travel on the screen and means communicable with said hood to receive the fresh-air stream and separate the fibers received in said hood from the fiber-air stream, said agitator means including a housing having an inlet fronting toward the cutter means and an outlet opening towards the front reach of the traveling screen, and said housing incorporating air jet means mounted between the inlet and outlet for pneumatically agitating and suspending the said cut pieces and pneumatically conveying them to the front reach of the screen through said outlet, while providing a differential air pressure across the front reach of the screen.

2. A fiber recovery system as claimed in claim 1 and in which the jet means are disposed within the housing closely adjacent to the housing inlet and along the path from the inlet toward but well short of the outlet.

3. A fiber recovery system as claimed in claim 1 and in which the outlet opening of the housing of the agitator means is of larger area than the inlet.

4. A fiber recovery system as claimed in claim 1 and in which the outlet opening of the housing of the agitator means is of smaller area than said hood which receives the fiber air stream.

* * * * *